3,077,498
N-(HALOGEN SUBSTITUTED ALKENYL) POLYHALOBENZAMIDES

Joseph W. Baker and John P. Chupp, Kirkwood, Mo., assignors to Monsanto Chemical Company, St. Louis, Mo., a corporation of Delaware
No Drawing. Filed Aug. 18, 1959, Ser. No. 834,423
4 Claims. (Cl. 260—558)

The present invention relates to N,N-halo-alkenyl amides of polyhalobenzoic acid.

The new compounds may be represented by the structure

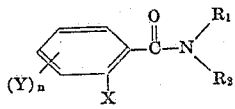

wherein X and Y are halogens, preferably chlorine, although other halogens may be used; $n$ is an integer of from 1 to 4, provided that when $n$ equals 1 then Y is in the number 6 position on the ring; and $R_1$ and $R_2$ each represent a halogen substituted lower alkenyl radical containing one double bond having halogen linked to unsaturated carbon.

Examples of lower alkenyl groups include 2-chloroallyl, 2-iodoallyl, 2-bromoallyl, 2-chloroisopropenyl, 3-chloro-2-butenyl, 3-iodo-2-butenyl, 3-chloro-2-pentenyl, 3-bromo-2-pentenyl, 2,3-dichloroallyl, 2-3-dibromoallyl, 2-chloro-3-fluoroallyl, 2,3-dichloro-2-butenyl, 2-chloro-3-bromo-butenyl, etc.

Included within the above class of compounds is a preferred group which have the structure

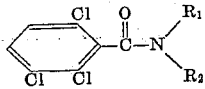

wherein $R_1$ and $R_2$ each represent a chloroallyl radical in which the chlorine is attached to an unsaturated carbon.

The compounds of this invention may be prepared by the reaction of a polyhalobenzoyl halide, preferably the chloride, with the appropriate amine. This reaction can be carried out in solution in an organic solvent and in the presence of a hydrogen chloride acceptor e.g. a tertiary amine, or an excess of the amine reactant. Similarly the reaction can be carried out in aqueous media, as for example, in a dilute aqueous solution of sodium carbonate (HCl acceptor). Because of the exothermic nature of the reaction, it is preferred to slowly add the acid chloride to the solution of the amine and hydrogen chloride acceptor. After the addition of the acid chloride is complete, and the reaction mixture has been agitated for a short period e.g. 30 minutes to 1 hour, the N,N-di-halo-alkenyl polyhalobenzamide can be recovered from the reaction mixture by any means known to those skilled in the art. For example, the product may be extracted from an aqueous reaction mixture by the use of a suitable organic solvent, e.g. methylene chloride; the product is then recovered by stripping off the organic solvent at subatmospheric pressures.

The following examples illustrate the preparation and properties of some of the new compounds of this invention but are not to be taken as a limitation thereon.

Example 1

N,N-BIS(2-CHLOROALLYL)-2′,3′,6′-TRICHLOROBENZAMIDE

To a suitable reaction vessel containing 18.2 grams (0.11 mole) of N,N-bis(2-chloroallyl) amine and 11.7 grams (0.11 mole) of sodium carbonate in 150 ml. of water, there is added dropwise with stirring, 24.4 grams (0.1 mole) of 2,3,6-trichlorobenzoyl chloride. After the addition of the benzoyl chloride is complete, the reaction mixture is stirred at about 50° C. for about 50 minutes. The product is then extracted with four 50 ml. portions of methylene chloride. The methylene chloride is stripped off up to 60° C. at 8 mm. Hg. absolute pressure. A liquid product is recovered which is indentified as N,N-bis(2-chloroallyl)-2′,3′,6′-trichlorobenzamide and is obtained in 83% theory yield. Analysis:

|  | Calculated | Found |
|---|---|---|
| Chlorine | 47.4 | 49.5 |

Using the procedure of Example 1, except by substituting an equivalent amount of the following secondary amines (column I) for the N,N-bis(2-chloroallyl) amine of said example, a good yield of the following N,N-bis(haloalkenyl)-2′,3′,6′-trihalobenzamides (column II) are obtained.

| Example No. | Column I, Amine Reactant | Column II, Product |
|---|---|---|
| 2 | N,N-bis(2-bromoallyl) amine. | N,N-bis(2-bromoallyl)-2′,3′,6′-trichlorobenzamide. |
| 3 | N,N-bis(2-iodoallyl) amine. | N,N-bis(2-iodoallyl)-2′,3′,6′-trichlorobenzamide. |
| 4 | N,N-bis(3-chloro-2-butenyl) amine. | N,N-bis(3-chloro-2-butenyl)-2′,3′,6′-trichlorobenzamide. |
| 5 | N,N-bis(2-chloro-3-fluoroallyl) amine. | N,N-bis(3-chloro-3-fluoroallyl)-2′,3′,6′-trichlorobenzamide. |
| 6 | N-2-chloroallyl-N-2,3-dichloroallyl amine. | N-2-chloroallyl-N-2,3-dichloroallyl-2′,3′,6′-trichlorobenzamide. |
| 7 | N,N-bis(2,3-dichloroallyl) amine. | N,N-bis(2,3-dichloroallyl)-2′,3′,6′-trichlorobenzamide. |
| 8 | N,N-bis(2,3-dichloro-2-butenyl) amine. | N,N-bis(2,3-dichloro-2-butenyl)-2′,3′,6′-trichlorobenzamide. |
| 9 | N-2-chloroallyl-N-3-chloro-2-butenyl amine. | N-2-chloroallyl-N-3-chloro-2-butenyl-2′,3′,6′-trichlorobenzamide. |
| 10 | N-2-iodoallyl-N-3-chloroallyl amine. | N-2-iodoallyl-N-3-chloroallyl-2′,3′,6′-trichlorobenzamide. |

Example 11

N,N-BIS(2-CHLOROALLYL)-2′,6′-DICHLOROBENZAMIDE

Employing the procedure of Example 1 except by substituting an equivalent amount of 2,6-dichlorobenzoyl chloride for the 2,3,6-trichlorobenzoyl chloride, a good yield of N,N-bis(2-chlorallyl)-2′,6′-dichlorobenzamide is obtained.

Employing the procedure of the foregoing examples, except by substituting the trichlorobenzoyl chloride with an equivalent amount of the following trihalobenzoyl chlorides, the following trihalobenzamides are prepared:

| Example No. | Column I Benzoyl Chloride | Column II Amine Reactant | Product |
|---|---|---|---|
| 12 | 2,3,6-triiodo benzoyl chloride. | N,N-bis(2-bromoallyl) amine. | N,N-bis(2-bromoallyl)2′,3′,6′-triiodobenzamide. |
| 13 | 2-chloro,3,6-dibromobenzoyl chloride. | N,N-bis(3-chloro-2-butenyl) amine. | N,N-bis(3-chloro-2-butenyl)2′-chloro-3′,6′ dibromobenzamide. |
| 14 | 2-fluoro,3,6-dichloro benzoyl chloride. | N,N-bis(2-3 dichloroallyl) amine. | N,N-bis(2,3-dichloroallyl)2′ fluoro-3′-6′-dichloro benzamide. |
| 15 | 2,3,4-trichlorobenzoylchloride. | N,N-bis(2-chloroallyl) amine. | N,N-bis(2-chloroallyl)-2′,3′,4′-trichlorobenzamide. |
| 16 | 2,4,5-trichlorobenzoyl chloride. | do | N,N-bis(2-chloroallyl)-2′,4′,5′-trichlorobenzamide. |

| Example No. | Column I Benzoyl Chloride | Column II Amine Reactant | Product |
|---|---|---|---|
| 17 | 2,3,5-trichlorobenzoyl chloride. | N,N-bis(2-chloroallyl) amine. | N-N,bis(2-chloroallyl)2',3',5'-trichlorobenzamide. |
| 18 | 2,3,4,5-tetrachlorobenzoyl chloride. | N,N-bis,2-bromoallyl) amine. | N,N-bis(2-bromoallyl) 2',3',4',5'-tetrachlorobenzamide. |
| 19 | 2,3,5,6-tetrachlorobenzoyl chloride. | N,N-bis(3-chloro-2-butenyl) amine. | N,N-bis(3-chloro-2-butenyl)-2',3',5',6'-tetrachlorobenzamide |
| 20 | Pentachlorobenzoyl chloride. | N,N-bis(2-chloroallyl) amine. | N,N-bis(2-chloroallyl) pentachlorobenzamide. |
| 21 | 2,3,4,6-tetrabromobenzoyl chloride. | N,N-bis(2,3-dichloroallyl) amine. | N,N-bis(2,3-dichloroallyl)-2',3',4',6'-tetrabromobenzamide. |
| 22 | 2,3,4,6-tetrachlorobenzoyl chloride. | N-2-chloroallyl-N-2,3-dichloroallyl amine. | N-2-chloroallyl-N-2,3-dichloroallyl-2'-3'-4'-6'-tetrachlorobenzamide. |
| 23 | 2,4,5,6-tetrachlorobenzoyl chloride. | N,N-bis(2-chloroallyl) amine. | N,N-bis(2-chloroallyl)-2',4',5',6'-tetrachlorobenzamide. |
| 24 | 2,3,4-tribromobenzoyl chloride. | N,N-bis(2-chloro-3-fluoroallyl) amine. | N,N-bis(2-chloro-3-fluoroallyl) 2',3',4'-tribromobenzamide. |

The compounds of this invention have a wide variety of biocidal uses. For example, N,N-bis(2-chloroallyl)-2',3',6'-trichlorobenzamide gave a 90% kill in the yellow fever mosquito larvae test (10 p.p.m. or 0.001% aqueous solution for 24 hours). Defoliant action is also obtained, e.g. 76–100% defoliation occurs when a solution containing 0.05% of N,N-bis(2-chloroallyl)-2',3',6'-trichlorobenzamide is applied to bean plants containing one mature trifoliat and one partially opened trifoliat (observation is made 14 days after spraying). The compounds of this invention are also useful for inhibiting the germination and growth of plants comprising desired and undesired plants in the same soil, e.g. inhibiting the germination and growth of pigweed, foxtail grass, brome grass, and crab grass, wherein blue grass or rye grass is present in the same soil.

This pre-emergence herbicidal use is covered in our copending application Serial Number 834,422, filed August 18, 1959.

Although this invention has been described with respect to certain specific embodiments, it is not so limited and it is to be understood that variations and modifications thereof obvious to those skilled in the art may be made without departing from the spirit or scope of this invention.

What is claimed is:
1. A compound of the structure

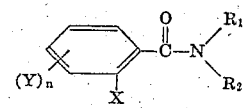

wherein X and Y are halogen atoms, $n$ is an integer of from 1 to 4, provided that when $n$ equals 1 then Y is in the number 6 position on the ring; and $R_1$ and $R_2$ each represent a halogen substituted lower alkenyl radical containing one double bond having halogen linked to an unsaturated carbon atom.

2. N,N-bis(2-chloroallyl)-2',6'-dichlorobenzamide.
3. A compound of the structure

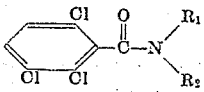

wherein $R_1$ and $R_2$ each represent a chloroallyl radical in which the chlorine is attached to an unsaturated carbon atom.

4. N,N-bis(2-chloroallyl)-2',3',6'-trichlorobenzamide.

References Cited in the file of this patent
UNITED STATES PATENTS

| 2,326,471 | Lontz | Aug. 10, 1943 |
| 2,412,510 | Jones | Dec. 10, 1946 |
| 2,551,891 | Martin et al. | May 8, 1951 |
| 2,687,403 | Ballard et al. | Aug. 24, 1954 |
| 2,726,947 | Baumgartner | Dec. 13, 1955 |

FOREIGN PATENTS

| 812,376 | Germany | Aug. 30, 1951 |

OTHER REFERENCES

Beilstein: Handbuch der Organische Chemie, vol. 9, 1926, p. 204.

Bottger et al.: Preliminary Test of Chlorinated Benzamides as Insecticides, U.S. Dept. of Agriculture Bulletin No. E–789 (1949), pp. 1–21, pages 5–8 relied on.

Handbook of Chemistry and Physics (35th ed.), pub. by Chemical Rubber Pub. Co. (Cleveland) 1953), pages 776, 782.